Oct. 26, 1943. A. G. STEINMAYER Re. 22,387

FUSE

Original Filed May 14, 1931 2 Sheets-Sheet 1

INVENTOR
Alwin G. Steinmayer
BY
Arthur R. Woolfolk
ATTORNEY

Oct. 26, 1943. A. G. STEINMAYER Re. 22,387

FUSE

Original Filed May 14, 1931 2 Sheets-Sheet 2

INVENTOR
Alwin G. Steinmayer
BY
Arthur R. Woodcock
ATTORNEY

Reissued Oct. 26, 1943 Re. 22,387

UNITED STATES PATENT OFFICE 22,387

FUSE

Alwin G. Steinmayer, Shorewood, Wis., assignor to Line Material Company, South Milwaukee, Wis., a corporation of Delaware Original No. 1,952,635, dated March 27, 1934, Serial No. 537,267, May 14, 1931. Reissue No. 22,092, dated May 5, 1942, Serial No. 434,023, March 9, 1942. This application for reissue June 4, 1943, Serial No. 489,721

25 Claims. (Cl. 200—127)

This invention relates to fuses and is particularly directed to an expulsion type of fuse structure and fuse link therefor.

One of the many difficulties involved in the use of expulsion type fuses is due to the fact that these fuses are often called upon to interrupt currents which are not very large. For instance, in farm line service the load is usually small and is often a non-inductive load. Under these conditions the usual types of expulsion fuses do not give entirely satisfactory results, for frequently the current is only sufficient to rupture a small portion of the fuse without causing complete expulsion, thus causing subsequent leakage and carbonization which often results in complete destruction of the fuse structure. In addition, these leaks cause radio interference.

While this invention is not to be construed as limited to low capacity expulsion fuses, it nevertheless is eminently suitable for such use and overcomes the defects noted above.

Objects of this invention are to provide an expulsion fuse which will insure complete and adequate separation of the severed portions of the fuse, even if the fuse is only slowly melted; which will have in addition an expulsion action thus securing quick clearing of the fuse for large overloads; which insures clearing of the fuse for both small and large overloads, and renders this clearing of the fuse, or opening of the circuit, certain and sure under all conditions of operation.

Further objects are to provide a fuse which closely conforms in dimensions to the standard type of expulsion fuses; which does not require an elaborate and expensive construction; which secures both the advantages of an expulsion action and also a spring action in insuring separation of the severed portions of the fuse; and in which the major parts, with the exception of the fusible section, are uninjured during operation, and may be used over and over.

Further objects are to provide an expulsion type of fuse which, in certain forms, is so constructed that a telltale or visible indication is given upon blowing of the fuse; in which a portion projects downwardly from the lower end of the fuse tube; and in which the projecting portion, even if presenting conducting portions, is restrained from passing completely from the fuse tube and dangling therefrom in a dangerous manner, and which, therefore, prevents danger to the linemen and avoids the danger of short circuits or connecting with adjacent live wires or grounded parts.

Embodiments of the invention are shown in the accompanying drawings, in which.

Figure 1:
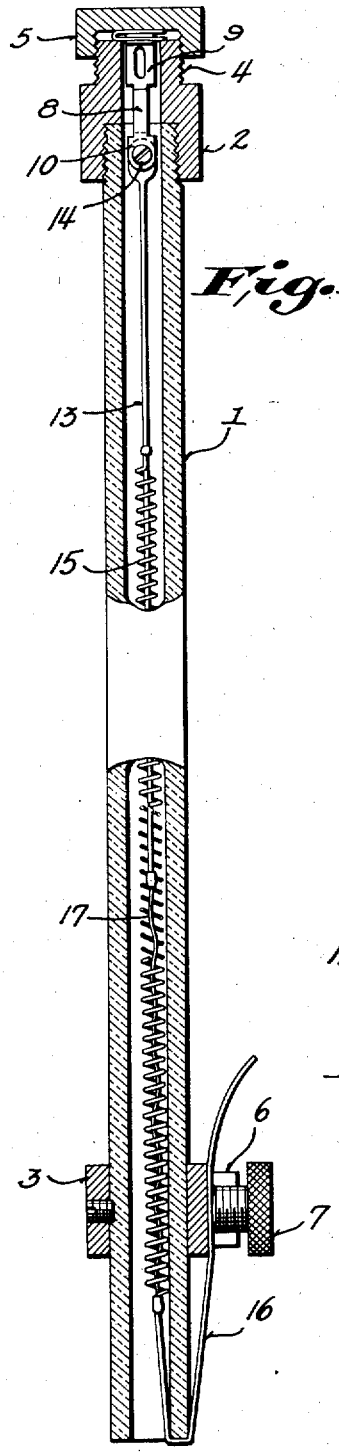
Figure 1 is a view, partly in section, of one form of the invention.

Referring to the drawings, particularly Figures 1 to 4, it will be seen that the expulsion fuse comprises a fuse cartridge of insulating material which may comprise the insulating tube 1, or which may be formed of a plurality of tubes in accordance with any of the standard constructions. This phase of the fuse construction forms no portion of the invention, and for the sake of clearness a single tube has been shown.

The expulsion fuse is provided with an upper contact 2 and a lower contact 3. The upper contact may consist of a sleeve threaded upon the upper end of the tube and is itself provided with a reduced externally threaded upper end 4. A metallic cap 5 is screwed upon this reduced end and serves to clamp the upper end of the fuse link in place. The lower contact surrounds the tube and is locked thereto in any suitable manner. It is provided with a pair of spaced ears 6 between which the lower end of the fuse link is passed. A threaded, knurled thumb screw 7 is in threaded engagement with the ears 6, and serves to clamp the lower end of the fuse link in place.

The fuse link in the form shown in Figures 1 to 4 comprises a fusible section 8 which may comprise an upper and a lower ribbon or wire of metal, preferably a high resistance alloy such as nickel-silver. It is also to be noted that the upper and lower ends 9 and 10 of the fusible section are larger than the intermediate portion of the fuse link. This intermediate portion has the two overlapping ribbons soldered together by a low melting point solder. The ribbons are in reality high resistance members, and the relative proportion of the cross section is such that under small overloads the low melting point solder is fused, whereas under high overloads it is frequently the case that the major portion of the ribbons themselves are fused. At least under the latter condition an expulsion action takes place. Somewhat of an expulsion action takes place even under small overloads. However, it frequently happens that under very small overloads, the full benefit of the expulsion action is not secured. This defect, however, is cured and eliminated by the structure hereinafter described, which is associated with the fusible section and forms a part of the fuse link.

Figure 3:
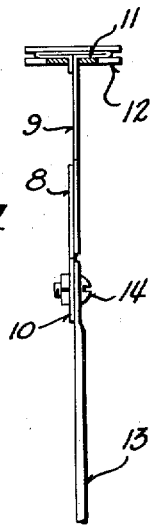
Figure 3 is an enlarged detail of the upper portion of the link.
Figure 4:
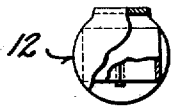
Figure 4 is a plan view of the structure shown in Figure 3, with parts broken away.

The enlarged upper portion of the fuse link is preferably provided with an upper reversely folded portion 11, which is clamped between the two plates 12 of an upper button or contact clip, the upper and lower portions of the clip being joined, as shown in Figure 4, and the lower portion being apertured to permit the passage therethrough of the upper end of the portion 9, see particularly Figures 3 and 4.

Figure 2:
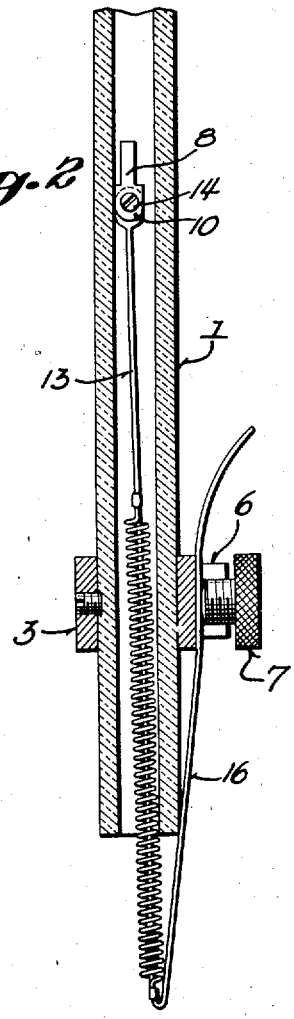
Figure 2 is a fragmentary view showing the position of the parts after the fuse has blown.

The lower portion of the fusible section is joined to a relatively rigid section 13 which may consist of a relatively rigid wire, as indicated in Figures 1, 2 and 3. This wire may be attached to the lower end of the fusible section in any suitable manner, as by means of the small screw 14. Any other mode of attachment may, of course, be used if it is found preferable. However, the use of the screw is desirable to permit ready substitution of new fusible sections, as it seldom occurs that any other portion of the fuse is damaged when rupture occurs.

The wire 13 or relatively rigid section, is elongated, and preferably at a point intermediate its end a helical spring 15 is attached. This helical spring is attached at its lower end to a relatively strong, flexible copper leader 16, which is clamped by means of the screw 7 to the lower contact 3. The ends of the rod 13 and the leader 16 are joined by means of a very flexible copper leader 17 located preferably within the helical spring 15. Electrically, the leaders 17 and 16 constitute the conducting means for carrying the current from the rod 13 to the lower contact 3, thereby preventing heating of the spring due to the passage of the current.

In view of the fact that these fuses are frequently used on farm lines and similar locations where the load is relatively small and is usually of a non-inductive nature, it is frequently the case that the overload is only of small value. Even under these conditions complete and wide separation of the severed portions of the fusible section is obtained by the construction described. For example, when the fuse blows, the spring draws the rod 13 downwardly thus aiding in the separation of the severed portion of the fusible section, such action of the spring assisting in any expulsion action that takes place at this time. Obviously the spring and rod do not interfere with the expulsion action of the fuse structure under considerable overload, but rather assist in the adequate separation of the severed portion of the fusible section.

By means of this construction a very large gap is obtained, and consequently there is no leakage that takes place after the fuse has blown. This avoids the heretofore serious defect in certain types of fuses due to leaking of the current between relatively closely positioned severed sections of the fusible portion of the link. This leaking, as is well known, frequently destroys the fuse structure. However, this invention wholly avoids such defect.

An additional advantage secured by this invention is that of a telltale action which indicates clearly when the fuse has blown. For example, Figure 2 shows the position of the parts after blowing of the fuse, and it will be seen that the rod or rigid member 13 is projected downwardly and extends outwardly below the lower open end of the tube 1, thus acting as a telltale. It is prevented from passing completely from the tube by means of the leader 16. A comparison of Figures 1 and 2 will show the action of the fuse very clearly.

The partial retention of the rod or rigid member 13 within the tube is very desirable. Consider on the other hand, what would happen if the spring were not strengthened, or held or guided by the rod 13. It would be projected outwardly from the tube and would dangle loosely from the lower portion of the structure. In view of its relative flexibility, it might readily be blown into other live portions of adjacent structures, or against a grounded section, or it might inadvertently contact with a lineman undertaking to renew the fuse. However, by means of the construction illustrated the complete expulsion of the spring and adjacent parts is prevented.

Figure 5:
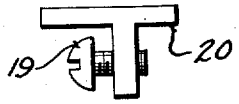
Figure 5 is a modified form of attaching means for the upper end of the fuse link.
Figure 6:
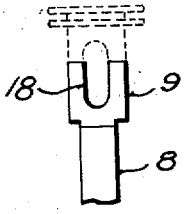
Figure 6 is a somewhat diagrammatic view showing how the upper end of the fuse link may be cut to cooperate with the type of fastening means shown in Figure 5.

It is to be noted from Figures 5 and 6 that the upper end 9 of the fusible section is preferably provided with a slot or opening 18. The purpose of this construction is to allow a customer to cut the upper end of the fusible section off, as shown in dotted lines in Figure 6, and to thereafter slip the resulting prongs of the fusible section on opposite sides of a screw 19 secured to a contact button 20, or to any other support as the case may be. In other words, this type of construction of the fusible section permits its use with at least two different types of upper attaching means.

Figure 7:
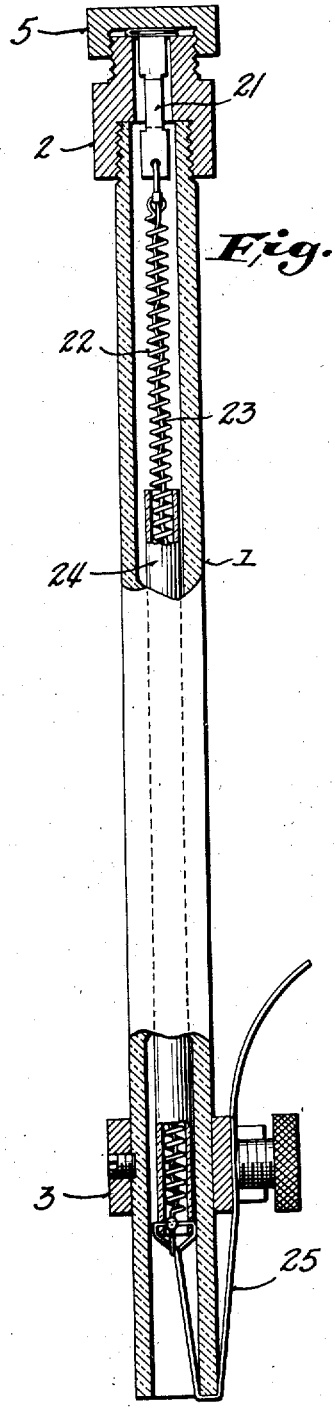
Figure 7 is a view, partly in section, showing a modified form of fuse.

Referring to Figure 7 where a modified form of the invention is disclosed, it will be seen that the same general inventive idea has been followed. The fusible section 21 may be of the same general type as that previously described and is locked to the upper contact 2 in any suitable manner, for instance by means of the cap 5. The lower end of the fusible section is attached to the upper end of a spring 22 and is also attached to a flexible copper leader 23 extending downwardly through the spring.

This spring is partially housed and received by a fiber or other insulating tube 24, which is attached to the spring adjacent the lower end of the tube 24 and the spring 22, as clearly shown in the lower portion of Figure 7. The tube 24 acts as the substantially rigid member corresponding roughly to the rod 13 previously described. The lower end of the spring 22, the leader 23 and the tube 24 are attached by means of a relatively strong copper leader 25 to the lower contact 3.

The operation of this fuse is substantially the same as that previously described. Upon blowing of the fuse, the spring insures adequate separation of the severed portion of the fusible section and the rigid tube 24 projects partially from the lower end of the insulating cartridge or tube 1.

The fusible section 21 may be of the same or of a different type from that previously described.

Figure 8:
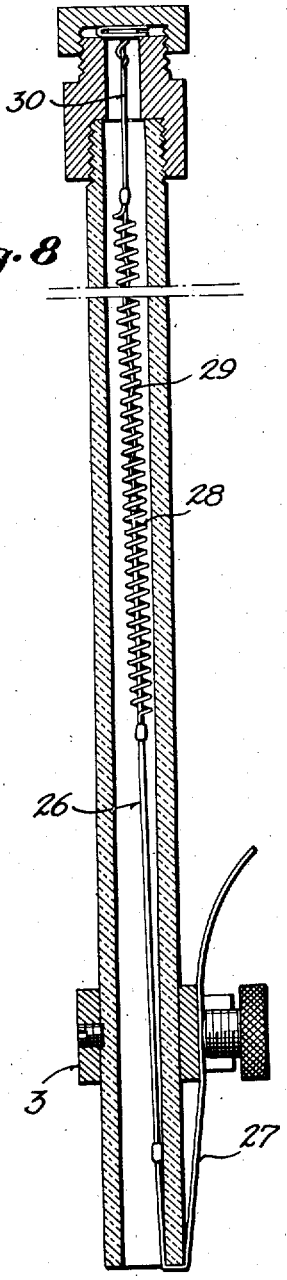
Figure 8 is a sectional view showing a still further form of fuse.

In the form of the invention shown in Figure 8, a relatively rigid rod 26 is attached to the lower leader 27, and intermediate the ends of the rod 26 a helical spring 28 is secured. A flexible copper leader 28 extends from the upper end of the rod 26 to the lower end of the fusible section 30. This fusible section may be of the type previously described, or may consist of either low fusible alloy wire, or nickel-silver wire, the nickel-silver wire being preferred. As shown in Figure 8, a single strand of wire has been shown for illustration.

At this point it is to be distinctly understood that any suitable type of fusible section may be employed. For example, in any forms of the invention any one of the several forms of fusible sections may be used in place of those specifically shown, or any other type of fusible section may be used.

It is to be again noted that the fuse cartridge or tube may be of any suitable form, the simplest form having been chosen merely for the sake of simplicity of illustration. In actual construction, it is frequently desirable to surround the inner tube with an outer porcelain tube, although this specific phase of the construction forms no portion of the invention.

Further it is to be distinctly understood that while Figure 1 shows the preferred form of construction, that nevertheless other types of fusible sections may be employed, or other types of construction conforming to the general spirit of the invention herein discussed.

It will be seen that a novel form of expulsion fuse and fuse link therefor has been disclosed, in which adequate separation of the severed portion of the fusible section is insured, irrespective of whether the overload is small or large, and it will be noted further that the action of the spring in no way interferes with the expulsion action of the fuse, but materially assists in the separation of the severed portion of the fusible element.

From actual tests conducted with this apparatus, it has been found that in by far the larger number of cases no damage is done to any portion of the fuse structure when the fuse blows, other than the fusible section, and that the parts may be used over and over, the fusible section alone being renewed.

It will be seen further that a very simple type of construction has been provided by this invention which is eminently practical, which may be cheaply made, and which is easy to renew and care for.

Although this invention has been described in considerable detail, it is to be understood that such description is intended as illustrative rather than limiting, as the invention may be variously embodied and is to be interpreted as claimed.

I claim:

1. A fuse link comprising a fusible section, a relatively rigid section, a flexible conducting section, and a helical spring coaxial with said relatively rigid section, said spring and said relatively rigid section being coextensive for at least a portion of their respective lengths.

2. A fuse link comprising a fusible section, a relatively rigid section, a flexible conducting section and a helical spring guided by said relatively rigid section and telescopically associated with said relatively rigid section.

3. A fuse comprising a non-extensible tube having an open lower end and having contacts adjacent each end; a fuse link carried within said tube and joining said contacts, said link comprising a fusible section, a relatively rigid elongated section, and a flexible section, and a spring secured to said relatively rigid section, said relatively rigid section comprising a tube and being telescopically related to said spring.

4. An expulsion fuse comprising a tube having an open lower end and having an upper contact and a lower contact, a fuse link in said tube and joining said contacts, said link having a fusible portion and a relatively rigid portion, and a spring for separating the severed portions of said fusible portion when said fuse blows, said relatively rigid portion of said link projecting downwardly from the open end of said tube when said fusible portion is ruptured.

5. An expulsion fuse comprising a tube having an open lower end and having an upper contact and a lower contact; a fuse link in said tube and joining said contacts, said link having a fusible portion and a relatively rigid portion; and a spring for separating the severed portions of said fusible portion when said fuse blows, said relatively rigid portion of said link projecting downwardly from the open end of said tube when said fusible portion is ruptured, and means for preventing said relatively rigid portion from passing completely from said tube.

6. An expulsion fuse comprising a tube having upper and lower contacts, a fuse link joining said contacts and having an upper fusible portion located in the upper portion of said tube, a spring for aiding, during the expulsion action of said fuse, in the separation of the severed portions of said link, and means for preventing the expulsion of the entire length of the spring from said tube.

7. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said helical spring having one end thereof anchored at one end of said tube.

8. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said helical spring being wholly carried by the link and with its lowermost end secured adjacent the lower end of the insulating tube.

9. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said fusible section being in electrical connection at one end with a terminal adjacent one end of said tube and in electrical connection at its other end with said flexible section and with one end of said helical spring, said spring having its other end in electrical connection with said flexible conducting section adjacent the other end of said insulating tube, and arranged to bias a portion of the fusible section away from said terminal.

10. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube, and said spring interconnecting said tube and said fusible section and placing the latter in tension.

11. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said flexible conducting section extending through said spring and out of an end of said insulating tube.

12. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said flexible conducting section extending through said spring and out of an end of said insulating tube, the portion of said flexible conducting section inside said spring being slack, whereby when the link is inserted in an expulsion type fuse cartridge and upon a pull being applied to the flexible conducting section the force of said pull is initially applied to said fusible section only through said spring.

13. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising a tube of such diameter and length as to be insertable within an expulsion fuse cartridge closed at one end and open at the other and having spaced external terminals to be electrically connected by said link.

14. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube of such diameter and length as to interrelate and support the fusible section, the flexible conducting section and the helical spring in a unitary inexpensive readily replaceable device adapted to be inserted into a standard expulsion type fuse cartridge for electrically connecting the terminals of the fuse cartridge together, with the spring exerting a biasing force within the link whereby a quick separation of the parts of the fusible section will be obtained when said section is ruptured by reason of a relatively small overload.

15. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said flexible conducting section extending through said spring and electrically connected at its upper end with said fusible section and having its lower portion extending out of the lower end of the tube.

16. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube and said flexible conducting section being in the form of a wire electrically connected at its upper end to said fusible section, a portion of said wire inside said tube between said fusible section and the lower end of the tube being of a length greater than the distance between said fusible section and the lower end of the tube, and said spring being so arranged and connected with respect to said tube and wire that when the link is inserted in a standard expulsion type fuse cartridge and a pull is exerted on said conducting section in applying the link to said cartridge an end of the spring may be pulled out of said insulating tube.

17. A fuse link comprising a fusible section, a relatively rigid section, a flexible conducting section, and a helical spring coaxial with said relatively rigid section, said spring and said relatively rigid section being coextensive for at least a portion of their respective lengths, said relatively rigid section comprising an insulating tube to guide the coils of said spring, and said flexible conducting section also being coextensive with said spring and in electrical connection with said fusible section.

18. A fuse link comprising a fusible section, a relatively rigid section, a flexible conducting section, and a helical spring guided by said relatively rigid section and telescopically associated with said relatively rigid section, said relatively rigid section comprising an insulating tube and said spring and flexible conducting section being in electrical connection with the lower end of said fusible section, said flexible conducting section being secured to said spring for applying the tension of said spring to said fusible section.

19. A fuse link comprising a fusible section, a relatively rigid section, a flexible conducting section, and a helical spring guided by said relatively rigid section and telescopically associated with said relatively rigid section, said relatively rigid section comprising an insulating tube and said spring and flexible conducting section being in electrical connection with the lower end of said fusible section and electrically in parallel with one another.

20. A fuse link comprising a fusible section, a relatively rigid section, a flexible conducting section, and a helical spring guided by said relatively rigid section and telescopically associated with said relatively rigid section, said rigid section comprising an insulating tube of such diameter and length that said spring is guidable within and by said tube, and said spring being held under tension between said tube and said fusible section.

21. The fuse link of claim 1 further characterized by the relatively rigid section being of a tubular formation and with said spring extending through a portion of the tubular section adjacent an end thereof for stressing the fusible section.

22. The fuse link of claim 2 further characterized by the relatively rigid section being of a tubular formation and with said spring disposed in a portion of the tubular section adjacent an end thereof for stressing the fusible section with said fusible section operatively associated with an upper extremity of the rigid tubular section.

23. The fuse link of claim 2 further characterized by the rigid section being of a tubular formation and by a portion of the spring stressed between one extremity of the tubular formation and an extremity of the fusible section.

24. A renewable fuse link adapted to be disposed substantially entirely within an expulsion fuse cartridge closed at its upper end and open at its bottom end, having spaced terminals to be electrically connected by said link, said link comprising a fusible section, a relatively rigid tubular section substantially co-axial therewith, and a helical spring coaxial with said relatively rigid section and having at least a portion thereof housed in said rigid section, whereby said spring portion and relatively rigid section are coextensive for a portion of the respective lengths of said rigid tubular section and said spring.

25. A renewable fuse link adapted to be mounted as a unit in an expulsion fuse cartridge closed at its upper end and open at its bottom end and having spaced terminals to be electrically connected by said link, said link comprising a relatively fusible section, a relatively rigid tubular section cooperable with the fusible section in the holding of the same under stress, a flexible conducting section and a helical spring guided by said relatively rigid tubular section and telescopingly associated therewith for placing the fusible section under stress.

ALWIN G. STEINMAYER.